US012652121B1

(12) United States Patent
Ong et al.

(10) Patent No.: US 12,652,121 B1
(45) Date of Patent: Jun. 9, 2026

(54) THERMALLY INSENSITIVE OPTICAL MULTIPLEXER

(71) Applicant: Marvell Asia Pte Ltd, Singapore (SG)

(72) Inventors: Jun Rong Ong, Singapore (SG);
Masaki Kato, Palo Alto, CA (US)

(73) Assignee: Marvell Asia Pte Ltd, Singapore (SG)

( * ) Notice: Subject to any disclaimer, the term of this patent is extended or adjusted under 35 U.S.C. 154(b) by 335 days.

(21) Appl. No.: 18/203,555

(22) Filed: May 30, 2023

Related U.S. Application Data

(60) Provisional application No. 63/346,565, filed on May 27, 2022.

(51) Int. Cl.
| | |
|---|---|
| *H04B 10/00* | (2013.01) |
| *G02B 6/27* | (2006.01) |
| *G02B 6/293* | (2006.01) |
| *G02B 6/30* | (2006.01) |
| *G02B 6/42* | (2006.01) |
| *H04B 10/50* | (2013.01) |
| *H04J 14/06* | (2006.01) |

(52) U.S. Cl.
CPC ............ *H04J 14/06* (2013.01); *G02B 6/2766* (2013.01); *G02B 6/2935* (2013.01); *G02B 6/29386* (2013.01); *G02B 6/305* (2013.01); *G02B 6/425* (2013.01); *H04B 10/5051* (2013.01)

(58) Field of Classification Search
CPC ..... H04J 14/06; G02B 6/2766; G02B 6/2935; G02B 6/29386; G02B 6/305; G02B 6/425; H04B 10/5051
See application file for complete search history.

(56) References Cited

U.S. PATENT DOCUMENTS

| | | | | |
|---|---|---|---|---|
| 9,618,821 | B2 * | 4/2017 | Jewart | ..................... G02F 1/225 |
| 9,784,921 | B1 * | 10/2017 | Zhang | .................. G02B 6/3594 |
| 10,133,004 | B2 | 11/2018 | Kato | |
| 11,385,407 | B2 | 7/2022 | Lin | |
| 11,968,035 | B1 * | 4/2024 | Chen | .................... G02B 27/283 |
| 2017/0003454 | A1 | 1/2017 | Baets | |
| 2019/0007157 | A1 * | 1/2019 | Anderson | .............. G02B 6/126 |
| 2020/0319409 | A1 * | 10/2020 | Su | ........................ H04J 14/0209 |

(Continued)

OTHER PUBLICATIONS

Chung et al., "Ultrashort and broadband silicon polarization splitter-rotator using fast quasiadiabatic dynamics," Optics Express, vol. 26, No. 8, Apr. 16, 2018, pp. 9655-9665.

(Continued)

*Primary Examiner* — Agustin Bello

(57) ABSTRACT

In an optical multiplexer, a first Mach-Zehnder interferometer (MZI) generates a first intermediate optical signal based on i) a first input optical signal at a first wavelength, and ii) a second input optical signal at a second wavelength. A second MZI generates a second intermediate optical signal based on i) a third input optical signal at a third wavelength, and ii) a fourth input optical signal at a fourth wavelength. A polarization combiner rotator (PCR) is coupled to the first MZI and the second MZI. The PCR generates an output optical signal based on i) the first intermediate optical signal received at a first input of the PCR, and ii) the second intermediate optical signal received at a second input of the PCR. The output optical signal includes the first input optical signal, the second input optical signal, the third input optical signal, and the fourth input optical signal.

9 Claims, 10 Drawing Sheets

(56)　　　　　References Cited

U.S. PATENT DOCUMENTS

| | | | | |
|---|---|---|---|---|
| 2023/0097053 A1* | 3/2023 | Doerr | .................. | H04B 10/556 |
| | | | | 398/17 |
| 2023/0246725 A1* | 8/2023 | Dong | .................. | H04B 10/506 |
| | | | | 398/83 |
| 2023/0396340 A1* | 12/2023 | Doerr | ..................... | H04J 14/06 |
| 2025/0208352 A1* | 6/2025 | Dai | ......................... | G02F 1/00 |

OTHER PUBLICATIONS

Nikbakht et al., "An asymmetric non-uniform 3-dB directional coupler with 300-nm bandwidth and a small footprint," arXiv preprint arXiv:2208.12148, Aug. 2022 (9 pages).

Sacher et al., "Polarization rotator-splitters in standard active silicon photonics platforms," Optics Express, vol. 22, No. 4, Feb. 10, 2014, pp. 3777-3786.

Yen et al., "Fabrication-tolerant CWDM (de) multiplexer based on cascaded Mach-Zehnder interferometers on silicon-on-insulator," J. Lightwave Technology, vol. 39, No. 1, Jan. 1, 2021, pp. 146-153.

* cited by examiner

| Adiabatic Coupler Parameter | Value |
|---|---|
| w1,right | 580 nm |
| w1,left | 480 nm |
| w2,right | 200 nm |
| w2,left | 380 nm |
| g | 300 nm |
| L | 300 μm |

Normalized Distance
from left side of adiabatic
coupler

THERMALLY INSENSITIVE OPTICAL MULTIPLEXER

CROSS REFERENCES TO RELATED APPLICATIONS

This application claims the benefit of U.S. Provisional Patent App. No. 63/346,565, entitled "Thermally Insensitive Wavelength Multiplexer." filed on May 27, 2022, the disclosure of which is expressly incorporated herein by reference in its entirety.

FIELD OF TECHNOLOGY

This disclosure relates generally to optical communications, and more particularly to optical multiplexers.

BACKGROUND

Coarse wavelength division multiplexing (CWDM) involves multiplexing a plurality of optical carrier signals onto a single optical fiber by using different wavelengths (sometimes referred to as "colors") of laser light. The International Telecommunications Union (ITU) standardized eighteen channels for CWDM in ITU standard G.694.2 using wavelengths from 1271 nanometers (nm) through 1611 nm with a channel spacing of 20 nm. Many CWDM wavelengths below 1470 nm are considered unusable on older optical fibers that conform to the older ITU standard G.652 due to increased attenuation in the 1270-1470 nm bands for such older fibers. Newer fibers that conform to the ITU standards G.652.C and G.652.D allow for full operation of all eighteen CWDM channels defined by ITU standard G.694.2.

CWDM transceivers use optical multiplexers to multiplex multiple colors onto a single optical fiber and use optical demultiplexers to demultiplex multiple colors received via a single optical fiber. Some types of optical multiplexers use thin film filters (TFFs) that are configured to transmit certain wavelengths and reflect other wavelengths. TFFs typically are made by depositing alternating thin layers of materials with desired optical properties onto a substrate, such as an optical-grade glass. Other types of optical multiplexers use optical couplers to multiplex multiple colors into a single optical signal. Typical optical multiplexers that use optical couplers suffer from temperature sensitivity, i.e., performance of the optical multiplexer varies as temperature varies.

SUMMARY

In an embodiment, an optical transmitter comprises: a plurality of lasers; a plurality of optical modulators coupled to the plurality of lasers; a baseband processor; and an optical multiplexer. The baseband processor is configured to: receive data that is to be transmitted; and generate, based on the data that is to be transmitted, modulation signals for controlling the plurality of optical modulators. The optical multiplexer comprises: a first Mach-Zehnder interferometer (MZI) configured to generate a first intermediate optical signal based on i) a first input optical signal at a first wavelength from a first optical modulator among the plurality of optical modulators, and ii) a second input optical signal at a second wavelength from a second optical modulator among the plurality of optical modulators; a second MZI configured to generate a second intermediate optical signal based on i) a third input optical signal at a third wavelength from a third optical modulator among the plurality of optical modulators, and ii) a fourth input optical signal at a fourth wavelength from a fourth optical modulator among the plurality of optical modulators; and a polarization combiner rotator (PCR) coupled to the first MZI and to the second MZI, the PCR configured to generate an output optical signal based on i) the first intermediate optical signal received at a first input of the PCR, and ii) the second intermediate optical signal received at a second input of the PCR, the output optical signal including the first input optical signal, the second input optical signal, the third input optical signal, and the fourth input optical signal.

In another embodiment, an optical multiplexer comprises: a first Mach-Zehnder interferometer (MZI) configured to generate a first intermediate optical signal based on i) a first input optical signal at a first wavelength received at a first input of the first MZI, and ii) a second input optical signal at a second wavelength received at a second input of the first MZI; a second MZI configured to generate a second intermediate optical signal based on i) a third input optical signal at a third wavelength received at a first input of the second MZI, and ii) a fourth input optical signal at a fourth wavelength received at a second input of the second MZI; and a polarization combiner rotator (PCR) coupled to the first MZI and the second MZI, the PCR configured to generate an output optical signal based on i) the first intermediate optical signal received at a first input of the PCR, and ii) the second intermediate optical signal received at a second input of the PCR, the output optical signal including the first input optical signal, the second input optical signal, the third input optical signal, and the fourth input optical signal.

DETAILED DESCRIPTION

In some embodiments described below, a thermally insensitive optical multiplexer provides relatively stable performance over a range of temperatures that the optical multiplexer is expected to encounter when deployed in the field. In some embodiments, the thermally insensitive optical multiplexer comprises: a first Mach-Zehnder interferometer (MZI) configured to generate a first intermediate optical signal based on i) a first input optical signal at a first wavelength, and ii) a second input optical signal at a second wavelength; a second MZI configured to generate a second intermediate optical signal based on i) a third input optical signal at a third wavelength, and ii) a fourth input optical signal at a fourth wavelength; and a polarization combiner rotator (PCR) coupled to the first MZI and the second MZI, the PCR configured to generate an output optical signal based on i) the first intermediate optical signal received at a first input of the PCR, and ii) the second intermediate optical signal received at a second input of the PCR.

Figure 1:
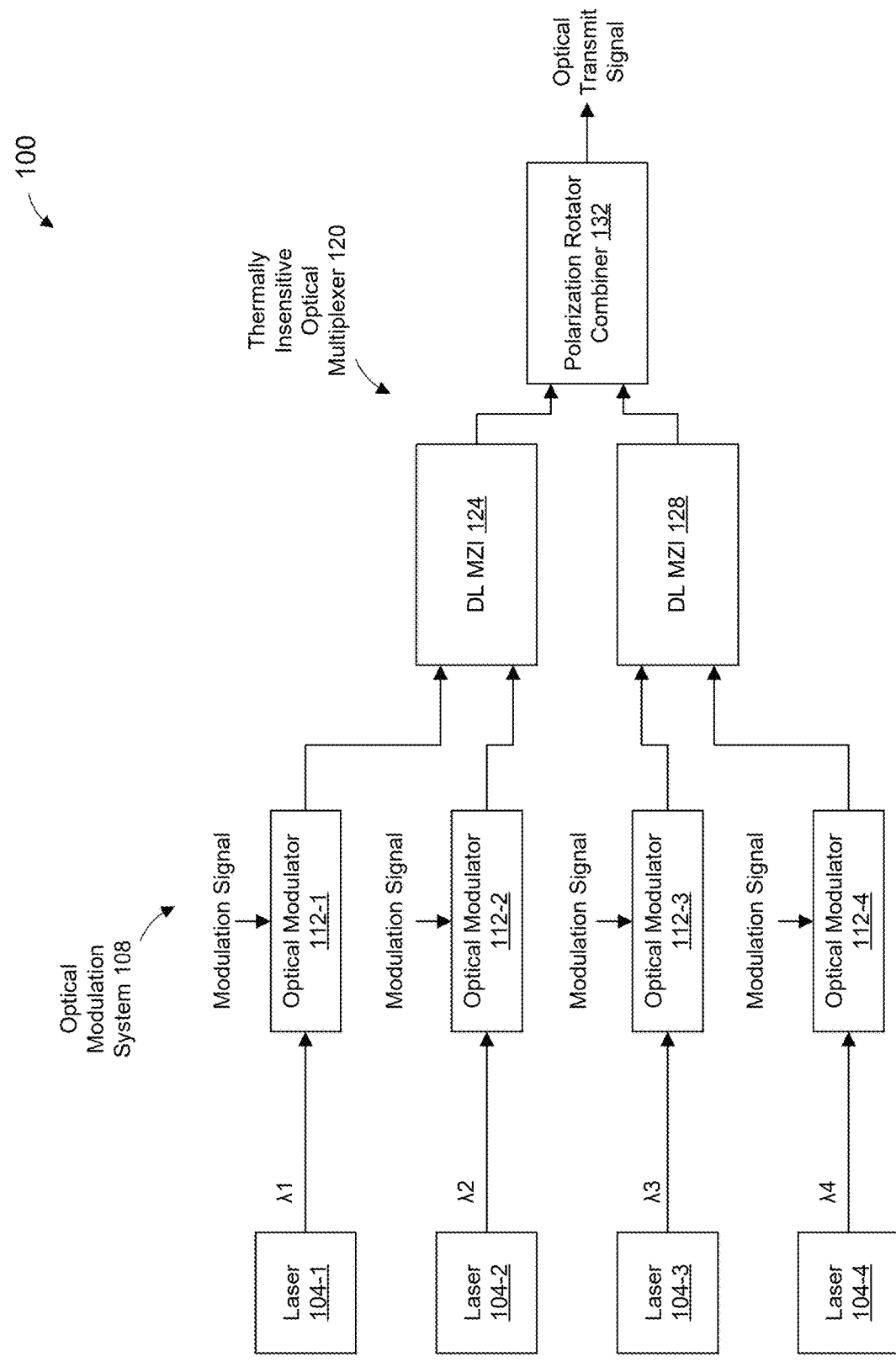
FIG. 1 is a simplified block diagram of an example optical module configured to generate an optical transmit signal, the optical module including a thermally insensitive optical multiplexer, according to an embodiment.

FIG. 1 is a simplified block diagram of an example optical module 100 that generates an optical transmit signal that includes multiple wavelengths, according to an embodiment. The optical module 100 includes a plurality of lasers 104. In an embodiment, the plurality of lasers 104 are configured to generate light at respective different wavelengths. For example, in a communication system that uses fiber optic cables conforming to the ITU standard G.652, the lasers 104 are configured to generate light at 1271 nanometer (nm) (referred to herein as λ1); 1291 nm (referred to herein as λ3); 1311 nm (referred to herein as λ2); and 1331 nm (referred to herein as λ4). In other embodiments, the lasers 104 generate light at other suitable wavelengths.

The optical module 100 also includes an optical modulation system 108. The optical modulation system 108 comprises a plurality of optical modulators 112. In an embodiment, the optical modulators 112 comprise Mach-Zehnder (MZ) modulators. In other embodiments, the optical modulation system 108 comprises suitable optical modulators other than MZ modulators.

Each modulator 112 has i) an optical input to receive light and ii) one or more modulation signal inputs configured to receive one or more modulation signals, e.g., from driver circuitry (not shown). Each modulator 112 is configured to modulate light received via the optical input based on the one or more modulation signals received via the one or more modulation signal inputs to generate a modulated optical output signal.

Outputs of the modulators 112 are provided to an optical multiplexer 120. The optical multiplexer 120 multiplexes the outputs of the modulators 112 into a single optical transmit signal for transmission via a fiber optic cable, for example The optical multiplexer 120 comprises a first delay line MZ interferometer (DL MZI) 124, a second DL MZI

128, and a polarization rotator combiner (PRC) 132. Outputs of the modulator 112-1 and the modulator 112-2 are provided to the first DL MZI 124, and outputs of the modulator 112-3 and the modulator 112-4 are provided to the second DL MZI 128. The first DL MZI 124 multiplexes the outputs of the modulator 112-1 and the modulator 112-2 to generate a first intermediate optical signal that includes i) the output of the modulator 112-1 at Al and ii) the output of the modulator 112-2 at 22. The second DL MZI 128 multiplexes the outputs of the modulator 112-3 and the modulator 112-4 to generate a second intermediate optical signal that includes i) the output of the modulator 112-3 at 23 and ii) the output of the modulator 112-4 at 24.

The output of the first DL MZI 124 is provided to a first input of the PRC 132, and the output of the second DL MZI 128 is provided to a second input of the PRC 132. The PRC 132 is configured to combine light received via the two inputs of the PRC 132 while rotating polarization of light corresponding to light received by a first input of the PRC 132 by 90 degrees with respect to polarization of light corresponding to light received by a second input of the PRC 132.

The combination of the first DL MZI 124, the second DL MZI 128, and the PRC 132 provides an optical multiplexer 120 that provides relatively stable performance over a range of temperatures that the optical multiplexer 120 is expected to encounter when deployed in the field, according to an embodiment. For instance, each DL MZI 24, 128 provides optical coupling of single wavelength signals that is relatively thermally insensitive, and the PRC 132 provides coupling of multiple wavelengths signals that is relatively thermally insensitive.

In operation, the modulation signals control the optical modulators 112 to modulate respective data onto the respective light received by the optical modulators 112. Further, modulated light from the optical modulator 112-1 and modulated light from the optical modulator 112-2 are combined by the DL MZI 124 to generate the first intermediate optical signal, and the first intermediate optical signal is provided to the first input of the PRC 132. Additionally, modulated light from the optical modulator 112-3 and modulated light from the optical modulator 112-4 are combined by the DL MZI 128 to generate the second intermediate optical signal, and the second intermediate optical signal is provided to the second input of the PRC 132. The PRC 132 combines the first intermediate optical signal and the second intermediate optical signal to generate the optical transmit signal.

Figure 2:
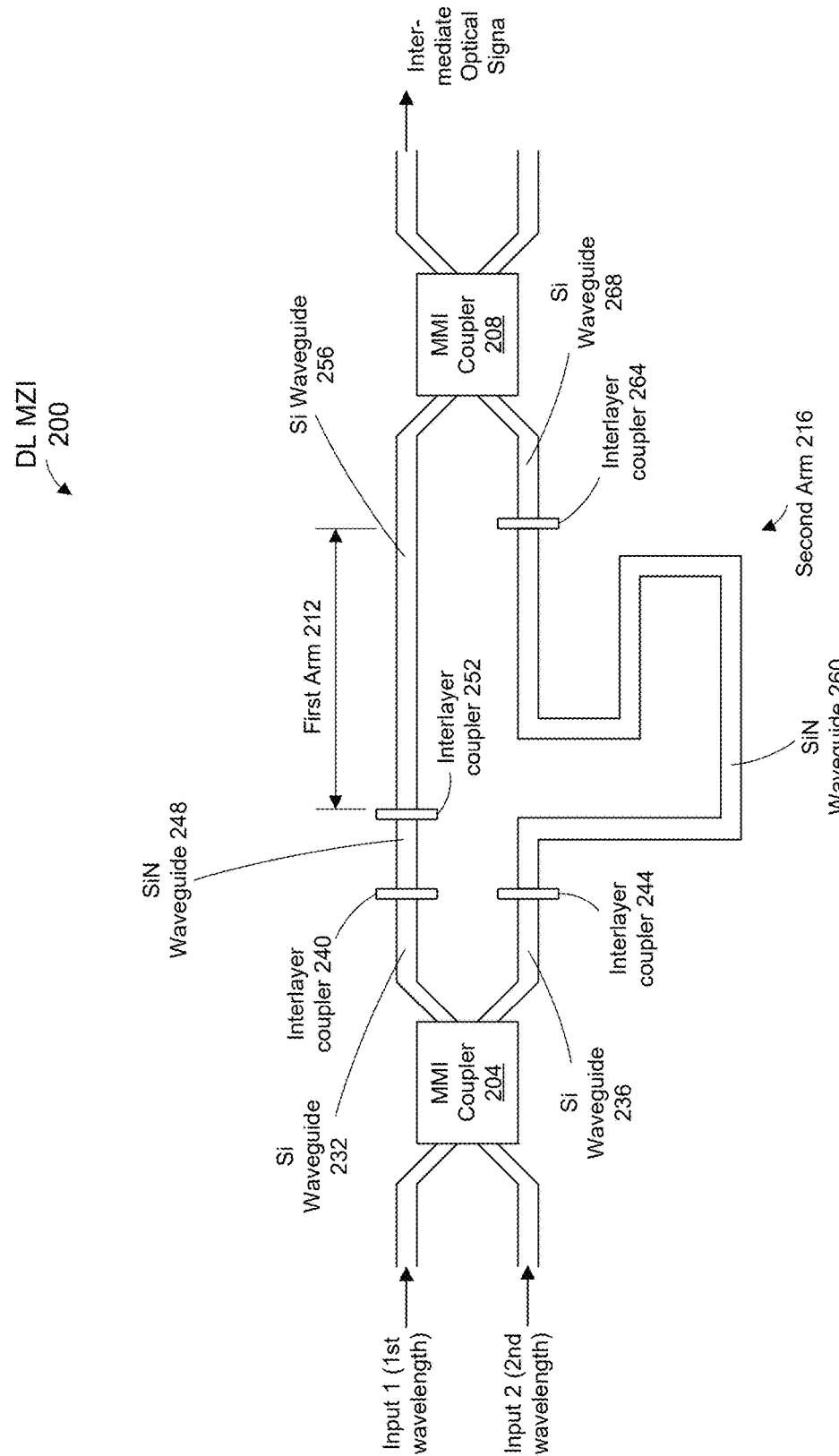
FIG. 2 is a simplified diagram of an example delay line Mach-Zehnder (MZI) coupler used in the optical module of FIG. 1, according to an embodiment.

In some embodiments, the first DL MZI 124 and the second DL MZI 128 have a structure configured to improve thermal insensitivity as compared to typical DL MZIs. FIG. 2 is a simplified diagram of an example DL MZI 200 that provides improved thermal insensitivity, according to an embodiment. Each of the first DL MZI 124 and the second DL MZI 128 has the structure illustrated in FIG. 2, according to an embodiment. In other embodiments, each of the first DL MZI 124 and the second DL MZI 128 has another suitable structure different than the DL MZI 200 of FIG. 2.

The DL MZI 200 includes a first optical coupler 204 and a second optical coupler 208. The first optical coupler 204 comprises a first multi-mode interference (MMI) coupler, and the second optical coupler 208 comprises a second MMI coupler, in an embodiment. In other embodiments, each of the first optical coupler 204 and the second optical coupler 208 comprise another suitable optical coupler different than an MMI coupler. The first optical coupler 204 is optically coupled to the second optical coupler 208 via a first waveguide arm 212 and a second waveguide arm 216. The second waveguide arm 216 has a length that is longer than a length of the first waveguide arm 212, and therefore introduces a time delay corresponding to one bit, according to an embodiment. As will be described in more detail below, the first waveguide arm 212 is fabricated using silicon (Si), whereas the second waveguide arm 216 is fabricated using silicon nitride (SiN). The use of different materials (e.g., Si vs. SiN) in the waveguide arms 212, 216 improves thermal insensitivity, in an embodiment.

The first optical coupler 204 comprises a first input to receive a first optical signal at a first wavelength and a second input to receive a second optical signal at a second wavelength. The first optical coupler 204 splits the first optical signal between a first output of the first optical coupler 204 and a second output of the first optical coupler 204. Additionally, the first optical coupler 204 splits the second optical signal between the first output of the first optical coupler 204 and the second output of the first optical coupler 204.

The first output of the first optical coupler 204 is coupled to an Si waveguide 232, and the second output of the first optical coupler 204 is coupled to an Si waveguide 236. The Si waveguide 232 guides light from the first output of the first optical coupler 204 to an interlayer coupler 240, and the Si waveguide 236 guides light from the second output of the first optical coupler 204 to an interlayer coupler 244.

The interlayer coupler 240 optically couples the Si waveguide 232 to an SiN waveguide 248, and an interlayer coupler 252 optically couples the SiN waveguide 248 to an Si waveguide 256. The Si waveguide 256 corresponds to the first arm 212.

The interlayer coupler 244 optically couples the Si waveguide 236 to an SiN waveguide 260, and an interlayer coupler 264 optically couples the SiN waveguide 260 to an Si waveguide 268. The SiN waveguide 260 corresponds to the second arm 216.

The interlayer coupler 240, the SiN waveguide 248, and the interlayer coupler 252 are added between the Si waveguide 232 and the Si waveguide 256 so that two interlayer couplers are in series with each of the first arm 212 and the second arm 216, which equalizes phase delays (caused by the interlayer couplers) in both a first path via the first arm 212 and a second path via the second arm 216.

In an embodiment, except for the first arm 212 and the second arm 216 denoted in FIG. 2, the first path from the MMI coupler 204 to the MMI coupler 208 via the first arm 212 has a same length as the second path from the MMI coupler 204 to the MMI coupler 208 via the second arm 216.

In an embodiment, the Si waveguides 232, 236, 256, 268 are fabricated on a first layer of a silicon photonics chip, and the SiN waveguides 248, 260 are fabricated on a second layer of the silicon photonics chip, the second layer being different than the first layer. In some such embodiments, the interlayer couplers 240, 244, 252, 252 direct light between Si waveguides in the first layer and SiN waveguides in the second layer.

The second optical coupler 208 comprises a first input coupled to the Si waveguide 256, and a second input coupled to the Si waveguide 268. The second optical coupler 208 recombines an optical signal from the first arm 212 with an optical signal from the second arm 216, and the optical signal from the first arm 212 interferes with the optical signal from the second arm 216 to generate an intermediate optical signal at an output of the second optical coupler 208.

Figure 3A:
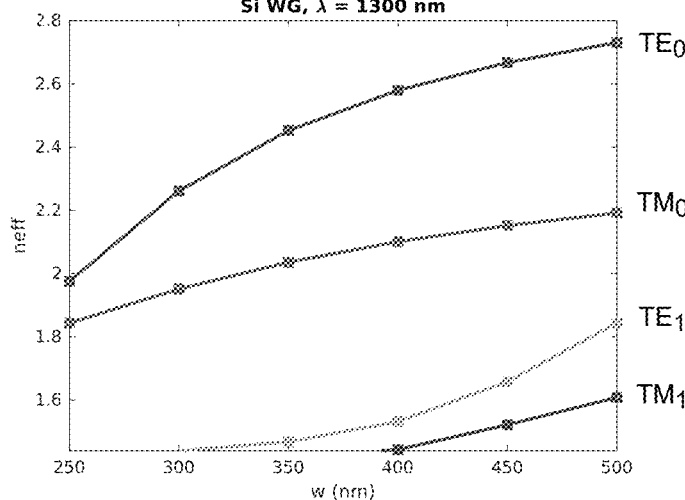
FIG. 3A is a plot of an effective index (neff) for various optical modes versus waveguide width for a silicon waveguide and for a wavelength of 1300 nm, according to an embodiment.
Figure 3B:
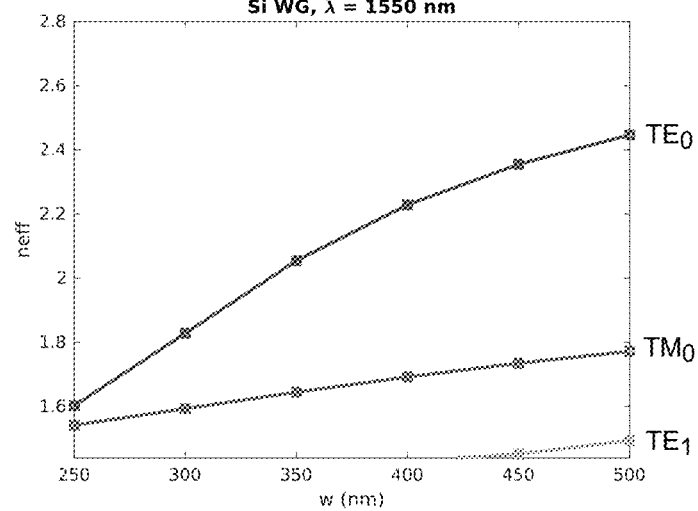
FIG. 3B is a plot of neff for various optical modes versus waveguide width for a silicon waveguide and for a wavelength of 1550 nm, according to an embodiment.

In some embodiments, widths of one or more of the waveguides 232, 236, 248, 256, 260, 268 are selected to avoid higher order modes and/or to improve temperature insensitivity. FIG. 3A is a plot of an effective index (neff) for various optical modes versus waveguide width for an Si waveguide and for a wavelength of 1300 nm, according to an embodiment. The effective index (neff) indicates a ratio of the velocity of light in a vacuum to a velocity of a mode for a given polarization (e.g., transverse electric (TE) vs. transverse magnetic (TM)) in a direction of propagation in a waveguide. FIG. 3B is a plot of neff for various optical modes versus waveguide width for an Si waveguide and for a wavelength of 1550 nm, according to an embodiment. As can be seen in FIGS. 3A-B, neff of higher order modes (i.e., $TE_1$, $TM_1$) for Si waveguide widths below 400 nm have relatively low neff and thus such waveguide widths tend to not support propagation of higher order modes.

Figure 4A:
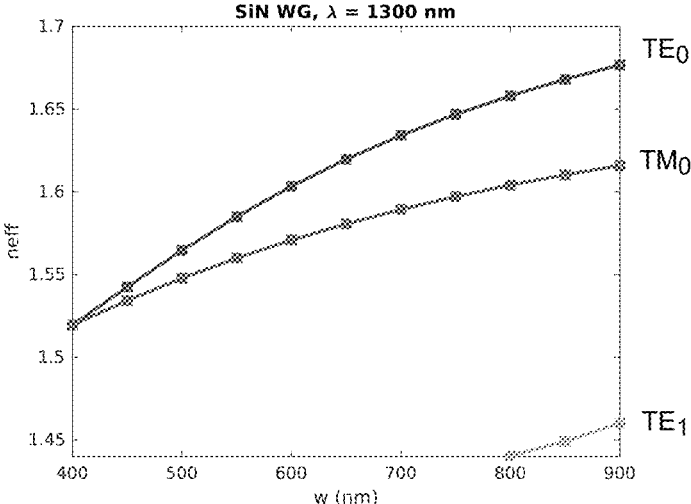
FIG. 4A is a plot of neff for various optical modes versus waveguide width for a silicon nitride waveguide and for a wavelength of 1300 nm, according to an embodiment.
Figure 4B:
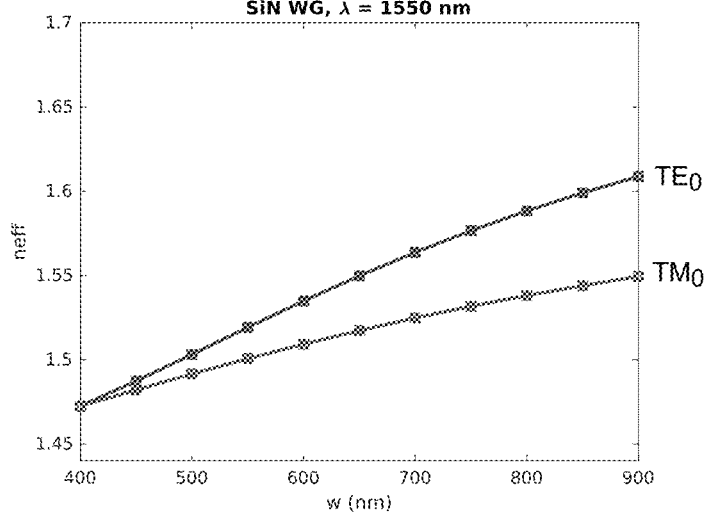
FIG. 4B is a plot of neff for various optical modes versus waveguide width for a silicon nitride waveguide and for a wavelength of 1550 nm, according to an embodiment.

FIG. 4A is a plot of neff for various optical modes versus waveguide width for an SiN waveguide and for a wavelength of 1300 nm, according to an embodiment. FIG. 4B is a plot of neff for various optical modes versus waveguide width for an SiN waveguide and for a wavelength of 1550 nm, according to an embodiment. As can be seen in FIGS. 4A-B, neff of higher order modes (i.e., $TE_1$, $TM_1$) for SiN waveguide widths below 850 nm have relatively low neff and thus such waveguide widths tend to not support propagation of higher order modes.

Figure 5A:
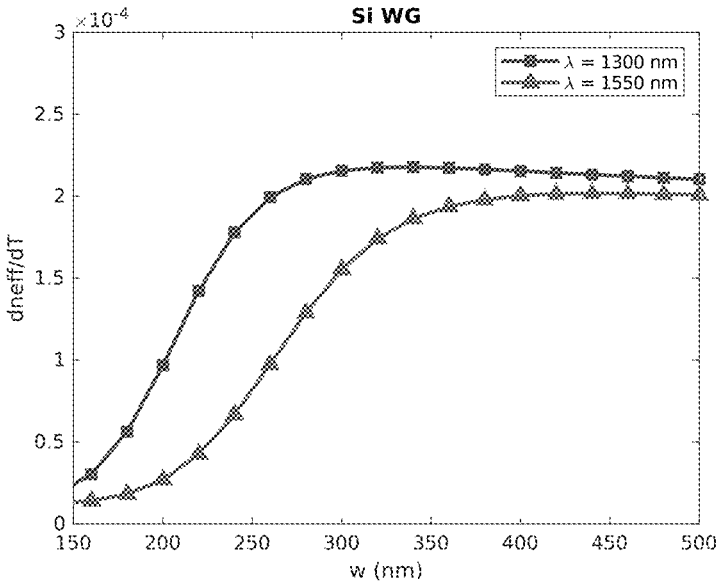
FIG. 5A is a plot of a rate of change of neff with respect to temperature (dneff/dT) versus a waveguide width for a silicon waveguide and for wavelengths of 1300 nm and 1550 nm, according to an embodiment.
Figure 5B:
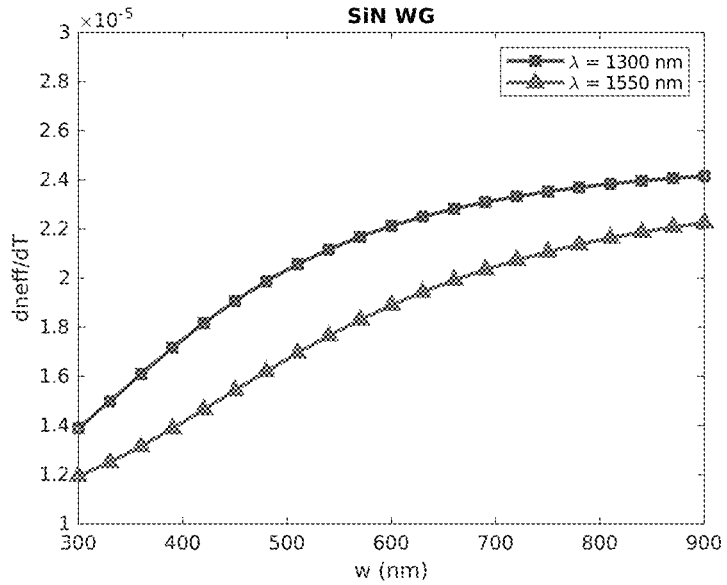
FIG. 5B is a plot of dneff/dT versus a waveguide width for a silicon nitride waveguide and for wavelengths of 1300 nm and 1550 nm, according to an embodiment.

FIG. 5A is a plot of a rate of change of neff with respect to temperature (dneff/dT) versus a waveguide width for an Si waveguide and for wavelengths of 1300 nm and 1550 nm, according to an embodiment. Similarly, FIG. 5B is a plot of dneff/dT versus a waveguide width for an SiN waveguide and for wavelengths of 1300 nm and 1550 nm, according to an embodiment. As can be seen in FIGS. 5A-B, dneff/dT for wavelengths 1300 nm and 1550 nm is closest above 350 nm and below 150 nm for Si waveguides, and is closest above 700 nm and below 400 nm for wavelengths 1300 nm and 1550 nm.

In an illustrative embodiment of a DL MZI 200 for wavelengths 1300 nm and 1550 nm, a width of the first arm 212 is selected as 380 nm, and width of the second arm 216 is selected as 800 nm. In other embodiments, other suitable widths are used for the first arm 212 and the second arm 216 for a DL MZI 200 for wavelengths 1300 nm and 1550 nm. Additionally, when the DL MZI 200 is to be used for wavelengths other than wavelengths 1300 nm and 1550 nm, other suitable widths are used for the first arm 212 and the second arm 216.

In an embodiment, the length ($L_1$) of the first arm 212 and the length ($L_2$) of the second arm 216 are chosen in an attempt to satisfy the following equations:

$$\frac{dn_2}{dT}L_2 - \frac{dn_2}{dT}L_1 = 0 \qquad \text{Equation 1}$$

$$\Delta\lambda = -\frac{\lambda^2}{n_{g,2}L_2 - n_{g,1}L_1} \qquad \text{Equation 2}$$

where $n_1$ is a refractive index of the first arm 212, $n_2$ is a refractive index of the second arm 216, $n_{g,1}$ is a group index of the first arm 212, $n_{g,2}$ is a group index of the second arm 216, and $\Delta\lambda$ is a free spectral range (FSR). In other embodiments, $L_1$ and $L_2$ are chosen in another suitable manner.

Table 1 lists respective example lengths of the first arm 212 and the second arm 216 for the DL MZI 124 and the DL MZI 128 when the DL MZI 124 and the DL MZI 128 have the structure of FIG. 2, according to an embodiment.

TABLE 1

| | FSR | Arm Lengths | Phase Shift |
|---|---|---|---|
| DL MZI 124: 1271 nm and 1311 nm | 80 nm | Arm 212: 1.4574 μm<br>Arm 216: 13.2228 μm | Arm 212: 0.88 rad.<br>Arm 216: 0 rad. |
| DL MZI 128: 1291 nm and 1331 nm | 80 nm | Arm 212: 1.4964 μm<br>Arm 216: 13.6617 μm | Arm 212: 2.35 rad.<br>Arm 216: 0 rad. |

Referring again to FIG. 1, the DL MZI 124 and the DL MZI 128 are configured to output light at a transverse electric (TE) fundamental mode (TE$_0$).

Figure 6:
FIG. 6 is a simplified diagram of an example polarization rotator combiner (PRC) used in the optical module of FIG. 1, according to an embodiment.
Figure 6:
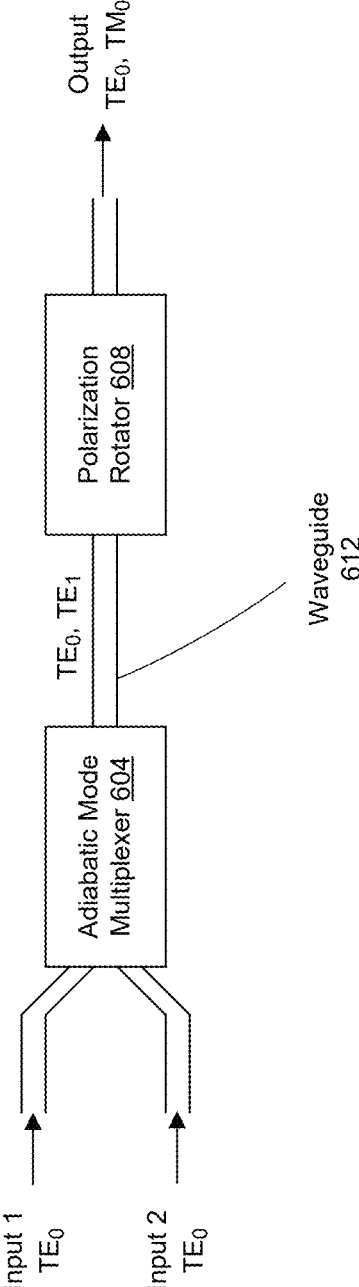

According to some embodiments, the PRC 132 has a structure configured to improve thermal insensitivity as compared to typical PRCs. FIG. 6 is a simplified diagram of an example PRC 600 that provides improved thermal insensitivity, according to an embodiment. The PRC 132 has the structure illustrated in FIG. 6, according to an embodiment. In other embodiments, the PRC 132 has another suitable structure different than the PRC 600 of FIG. 6.

The PRC 600 includes an adiabatic mode multiplexer 604 and a polarization rotator 608. The adiabatic mode multiplexer 604 is optically coupled to the polarization rotator 608 via a waveguide 612. In another embodiment, the adiabatic mode multiplexer 604 is optically coupled to the polarization rotator 608 via freespace.

The adiabatic mode multiplexer 604 comprises a first input to receive a first optical signal from the DL MZI 124 (FIG. 1) and a second input to receive a second optical signal from the DL MZI 128 (FIG. 1). In an embodiment, the first optical signal from the DL MZI 124 (FIG. 1) is at a mode TE$_0$, and the second optical signal from the DL MZI 128 (FIG. 1) is at a mode TE$_0$.

The adiabatic mode multiplexer 604 includes one or more tapered waveguides (not shown), each having a width that changes slowly (i.e., adiabatically) on a scale of the light wavelength. The adiabatic mode multiplexer 604 is configured to multiplex the first optical signal and the second optical signal while converting the mode of second optical signal from TE$_0$ to a first-order TE (TE$_1$) mode.

The polarization rotator 608 is configured to receive the first optical signal and the second optical signal and to rotate the second optical signal from TE$_1$ to a fundamental transverse magnetic (TM$_0$) mode.

Figure 7:
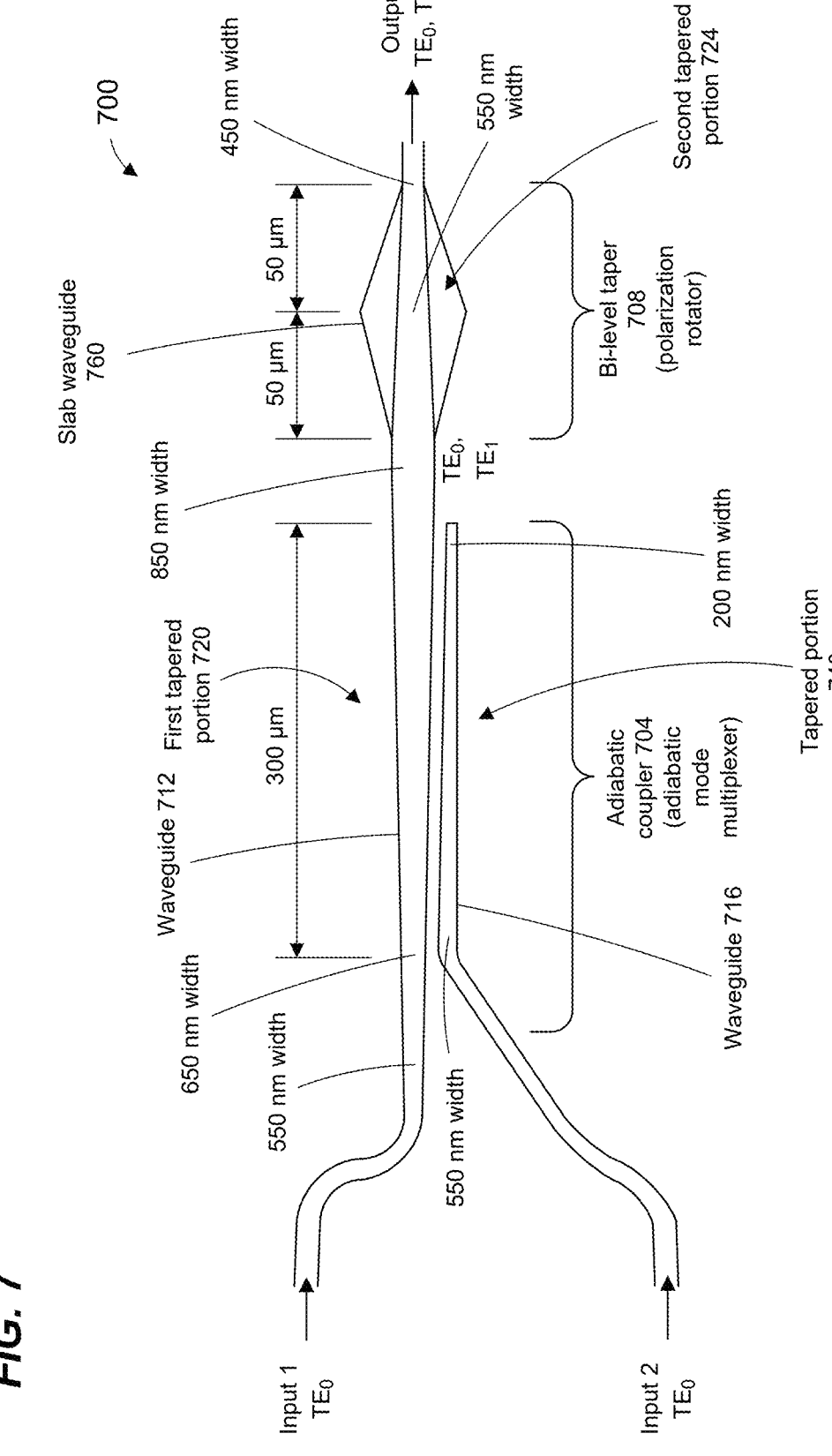
FIG. 7 is a simplified diagram of an example PRC used as the PRC of FIG. 6, according to an embodiment.

In some embodiments, the PRC 600 has a structure configured to improve thermal insensitivity. FIG. 7 is a simplified diagram of an example PRC 700 that provides improved thermal insensitivity, according to an embodiment. The PRC 600 (FIG. 6) has the structure illustrated in FIG. 7, according to an embodiment. In other embodiments, the PRC 600 (FIG. 6) has another suitable structure different than the PRC 700 of FIG. 7. The PRC 132 (FIG. 1) has the structure illustrated in FIG. 7, according to an embodiment. In other embodiments, the PRC 132 has another suitable structure different than the PRC 700 of FIG. 7.

The PRC 700 includes an adiabatic coupler 704 (e.g., an adiabatic mode multiplexer) optically coupled to a bi-level taper 708 (e.g., a polarization rotator). The PRC 700 comprises a first input to receive a first optical signal from the DL MZI 124 (FIG. 1) and a second input to receive a second optical signal from the DL MZI 128 (FIG. 1). In an embodiment, the first optical signal from the DL MZI 124 (FIG. 1) is at a mode TE$_0$, and the second optical signal from the DL MZI 128 (FIG. 1) is at a mode TE$_0$.

The PRC 700 includes a waveguide 712 and a waveguide 716. The waveguide 712 receives the first optical signal from the DL MZI 124 (FIG. 1) and the waveguide 716 receives the second optical signal from the DL MZI 128 (FIG. 1). The waveguide 712 includes a first tapered portion 720 and a second tapered portion 724. The first tapered portion 720 is a component of the adiabatic coupler 704, and the second tapered portion 724 is a component of the bi-level taper 708.

The first tapered portion 720 has a length of 300 μm, according to an embodiment. In other embodiments, the first tapered portion 720 has another suitable length. A first end of the first tapered portion 720 closest to the first input of the PRC 700 has a width of 650 nm, according to an embodiment. In other embodiments, the first end of the first tapered portion 720 has another suitable width. A second end of the first tapered portion 720 closest to the bi-level taper 708 has a width of 850 nm, according to an embodiment. In other embodiments, the second end of the first tapered portion 720 has another suitable width.

The waveguide 716 includes a tapered portion 740. The tapered portion 740 has a length of 300 μm, according to an embodiment. In other embodiments, the tapered portion 740 has another suitable length. A first end of the tapered portion 740 closest to the second input of the PRC 700 has a width of 550 nm, according to an embodiment. In other embodiments, the first end of the tapered portion 740 has another suitable width. A second end of the tapered portion 740 closest to the bi-level taper 708 has a width of 200 nm, according to an embodiment. In other embodiments, the second end of the tapered portion 740 has another suitable width.

The first tapered portion 720 is spaced apart from the second tapered portion 740 in the adiabatic coupler 704 by a gap distance of 200 nm, according to an embodiment. In other embodiments, the first tapered portion 720 is spaced apart from the second tapered portion 740 by another suitable distance.

Figures 8A, 8B:
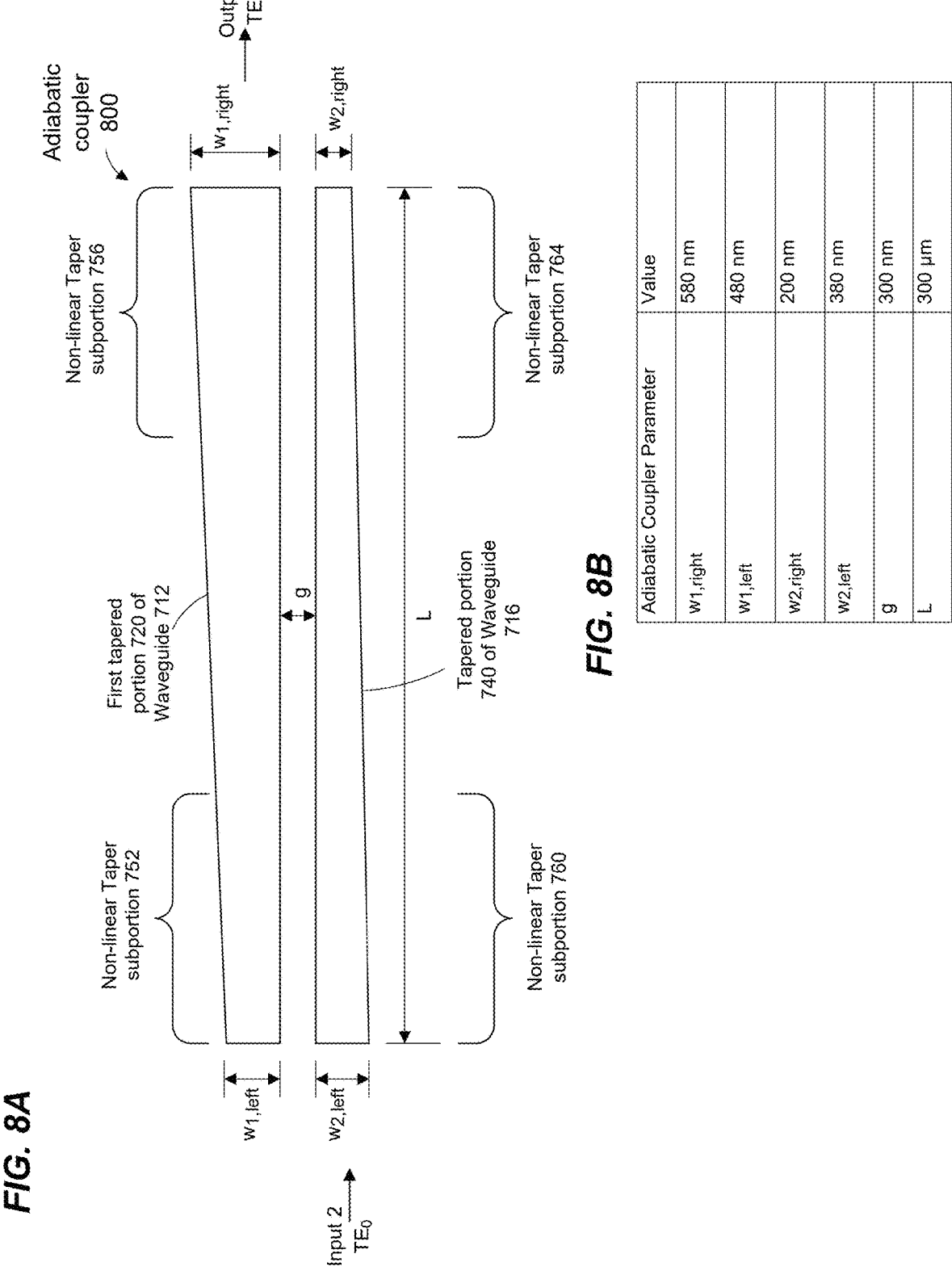
FIG. 8A is a simplified diagram of an example adiabatic coupler that is used in the PRC of FIG. 7, according to an embodiment.
FIG. 8B is a table listing example dimensions of the adiabatic coupler of FIG. 8A, according to an embodiment.

FIG. 8A is a diagram of another example adiabatic coupler 800 that is used in a PRC, and FIG. 8B is a table 850 listing example dimensions of the adiabatic coupler 800, according to an embodiment. In other embodiments, the adiabatic coupler 800 has suitable dimensions different than the dimensions in table 850. The adiabatic coupler 800 is used as the adiabatic coupler 704 (FIG. 7), according to an embodiment. In other embodiments, the adiabatic coupler 704 has suitable dimensions different than the adiabatic coupler 800 of FIGS. 8A-B.

Referring again to FIG. 7, in operation the second optical signal within the waveguide 716 is transferred to the waveguide 712 within the adiabatic coupler 704. Additionally, the mode of the second optical signal transitions to TE$_1$ when the second optical signal transfers to the waveguide 712.

The bi-level taper 708 comprises the second tapered portion 724 of the waveguide 712. A first end of the second tapered portion 724 closest to the adiabatic coupler 704 has a width of 850 nm, according to an embodiment. In other embodiments, the first end of the second tapered portion 724 has another suitable width. A second end of the second tapered portion 724 farthest from the adiabatic coupler 704 has a width of 450 nm, according to an embodiment. In other embodiments, the second end of the second tapered portion 724 has another suitable width.

The bi-level taper 708 also comprises a slab waveguide 760 that is positioned over (or below) the second tapered portion 724 of the waveguide 712. The slab waveguide 760 has a length of 100 μm, according to an embodiment. In other embodiments, the slab waveguide 760 has another suitable length. A first end of the slab waveguide 760 closest to the adiabatic coupler 704 has a width of 850 nm, according to an embodiment. In other embodiments, the first end of the slab waveguide 760 has another suitable width. A second end of the slab waveguide 760 farthest from the adiabatic coupler 704 has a width of 450 nm, according to an embodiment. In other embodiments, the second end of the slab waveguide 760 has another suitable width. A middle of the slab waveguide 760 has a width of 1.55 μm, according to an embodiment. In other embodiments, the middle of the slab waveguide 760 has another suitable width.

In operation, the mode of the second optical signal within the bi-level taper 708 is transitioned from $TE_1$ to $TM_0$.

In some embodiments, one or more of i) the tapering of the first tapered portion 720 of the waveguide 712, ii) the tapering of the tapered portion 740 of the waveguide 716, iii) the tapering of the second tapered portion 724 of the waveguide 712, and iv) the tapering of the slab waveguide 760 varies linearly along a length of the waveguide. In other embodiments, one or more of i) the tapering of the first tapered portion 720 of the waveguide 712, ii) the tapering of the tapered portion 740 of the waveguide 716, iii) the tapering of the second tapered portion 724 of the waveguide 712, and iv) the tapering of the slab waveguide 760 varies nonlinearly along a length of the waveguide. In some embodiments, varying tapering nonlinearly permits using a shorter length device and therefore reduces costs.

For example, a width of a subportion 752 of the first tapered portion 720 of the waveguide 712 varies nonlinearly along a length of the waveguide 712, and a width of a subportion 756 of the first tapered portion 720 of the waveguide 712 also varies nonlinearly along a length of the waveguide 712, according to an embodiment. In an embodiment, a width of the waveguide 712 between the subportion 752 and the subportion 756 varies linearly along a length of the waveguide 712. In another embodiment, the width of the waveguide 712 between the subportion 752 and the subportion 756 varies nonlinearly along the length of the waveguide 712.

A width of a subportion 760 of the tapered portion 740 of the waveguide 716 varies nonlinearly along a length of the waveguide 716, and a width of a subportion 764 of the tapered portion 740 of the waveguide 716 also varies nonlinearly along a length of the waveguide 716, according to an embodiment. In an embodiment, a width of the waveguide 716 between the subportion 760 and the subportion 764 varies linearly along a length of the waveguide 716. In another embodiment, the width of the waveguide 716 between the subportion 760 and the subportion 764 varies nonlinearly along the length of the waveguide 716.

Figure 9A:
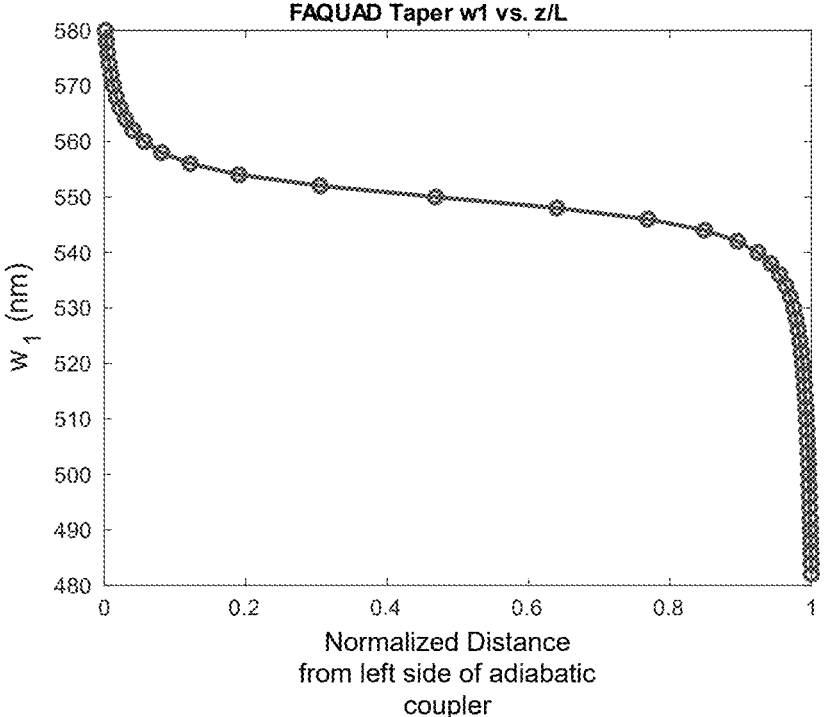
FIG. 9A is a plot of a width of a first waveguide of the adiabatic coupler of FIG. 8A, according to an embodiment.
Figure 9B:
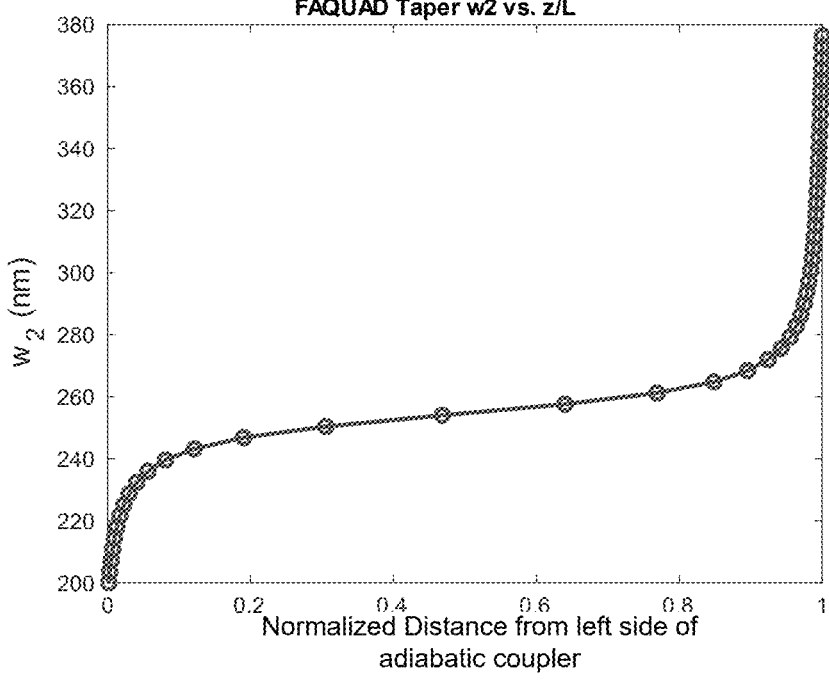
FIG. 9B is plot of a width of a second waveguide of the adiabatic coupler of FIG. 8A, according to an embodiment.

FIG. 9A is plot of a width ($w_1$) of the first tapered portion 720 of the waveguide 712 versus a position along a length of the first tapered portion 720, according to an embodiment. In FIG. 9A, the value zero on the x-axis corresponds to a left-most position (when viewing FIG. 8A) of the first tapered portion 720, and the value one on the x-axis corresponds to a right-most position (when viewing FIG. 8A) of the first tapered portion 720. Similarly, FIG. 9B is a plot of a width ($w_2$) of the tapered portion 740 of the waveguide 716 versus a position along a length of the tapered portion 740, according to an embodiment. In FIG. 9B, the value zero on the x-axis corresponds to a left-most position (when viewing FIG. 8A) of the tapered portion 740, and the value one on the x-axis corresponds to a right-most position (when viewing FIG. 8A) of the tapered portion 740.

Figure 10:
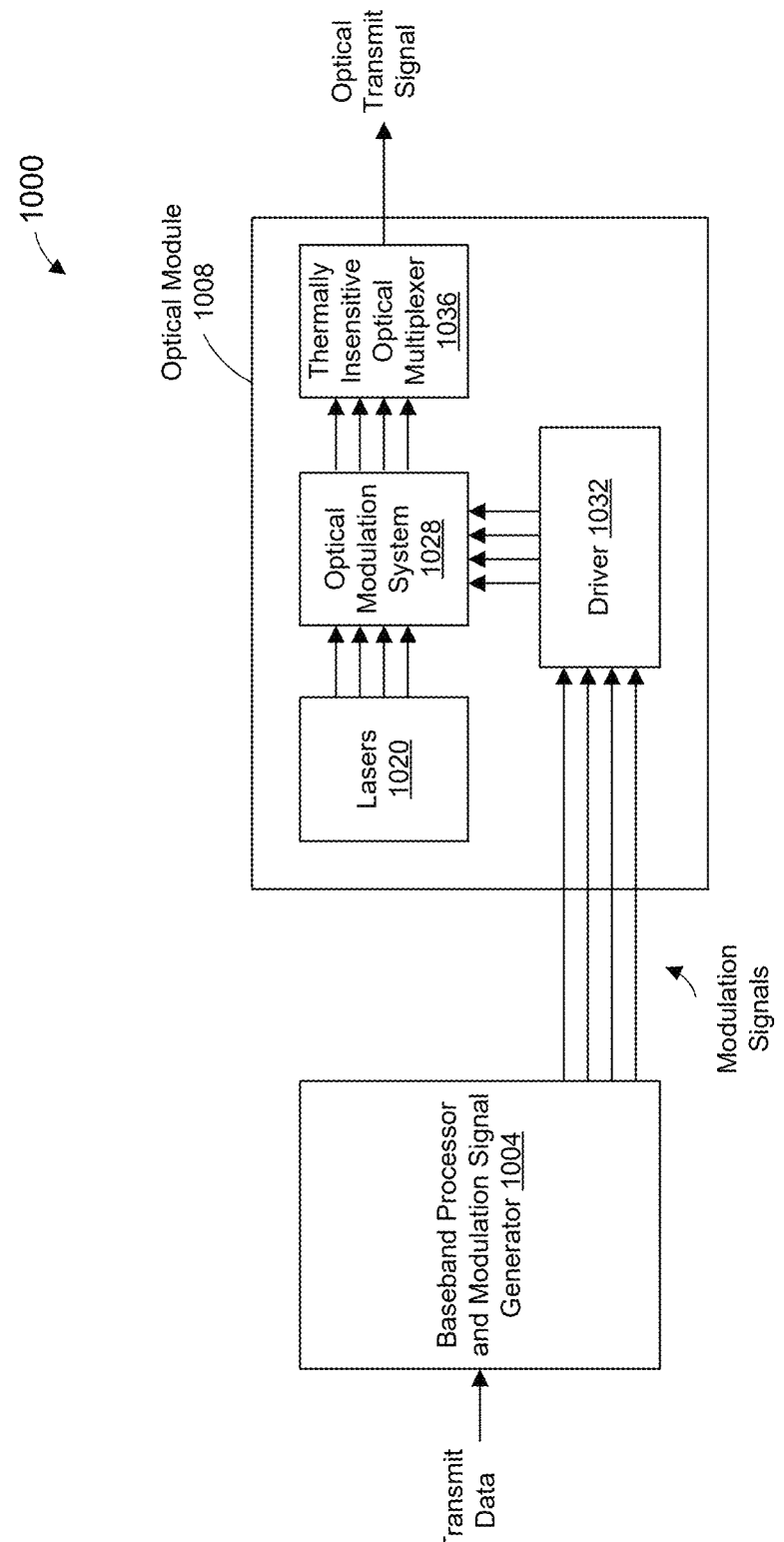
FIG. 10 is a simplified diagram of an example optical transmitter that includes the optical module of FIG. 1, according to an embodiment.

FIG. 10 is a simplified diagram of an example optical transmitter 1000, according to an embodiment. The optical transmitter 1000 comprises a baseband processor and modulation signal generator 1004 (sometimes referred to herein as the "baseband processor 1004" for brevity) that is configured to i) receive data (e.g., from a host processor (not shown)) that is to be transmitted via an optical communication medium (not shown), and ii) use the received data to generate modulation signals.

The optical transmitter 1000 also comprises an optical module 1008 coupled to the baseband processor 1004. The optical module 1008 is configured to use the modulation signals from the baseband processor 1004 to generate an optical transmit signal for transmission via the optical communication medium.

The baseband processor 1004 includes a digital signal processing circuitry (DSP, not shown) that is configured to perform various processing actions such as one or more of i) forward error correction (FEC) encoding, ii) signal precompensation, etc. Additionally, the DSP is also configured to map data that is to be transmitted to transmission symbols (e.g., to intensity levels for intensity modulation, to constellation points for M-QAM, etc.). The DSP is further configured to generate digital modulation signals based on the transmissions symbols.

The baseband processor 1004 also comprises analog front end (AFE) circuitry (not shown) that is configured to generate analog modulation signals based on the digital modulation signals output by the DSP. For example, the AFE includes one or more analog-to-digital converters (ADCs) that are configured to convert the digital modulation signals to analog modulation signals.

The optical module 1008 comprises a plurality of lasers 1020 optically coupled to an optical modulation system 1028. The plurality of lasers 1020 correspond to the lasers 104 of FIG. 1, and the optical modulation system 1028 corresponds to the optical modulation system 108 of FIG. 1, for example.

The optical module 108 also comprises driver circuitry 1032 coupled to the optical modulation system 1028.

In an embodiment, each laser in the plurality of lasers 1020 is configured to generate light at a respective wavelength.

The driver circuitry 1032 is configured to condition modulation signals received from the baseband processor 1004 to generate conditioned modulation signals, and to provide the conditioned modulation signals to the optical modulation system 1028. The optical modulation system 1028 then modulates light received from the lasers 1020 based on the conditioned modulation signals. In some embodiments, the driver circuitry 1032 is included in the baseband processor 1004, for example as part of the AFE circuitry discussed above.

In operation, when data is to be transmitted via multiple wavelengths using intensity modulation, the baseband processor 1004 generates, using received data (e.g., from a host computer), modulation signals that correspond to intensity modulation, and provides the modulation signals to the driver 1032. The driver 1032 then provides conditioned modulation signals to the optical modulation system 1028, which causes the optical modulation system 1028 to modulate data onto the multiple wavelengths using intensity modulation.

The optical module 1008 also comprises a thermally insensitive optical multiplexer 1036. The thermally insensitive optical multiplexer 1036, which comprises a first DL MZI, a second DL MZI, and a PRC, multiplexes the outputs of the modulation system 1028 into a single optical transmit signal for transmission via a fiber optic cable, for example. The thermally insensitive optical multiplexer 1036 corresponds to the thermally insensitive optical multiplexer 120 of FIG. 1, for example.

Although embodiments described above involve multiplexing the wavelengths λ1 (1271 nm), λ2 (1311 nm), λ3 (1291 nm), and λ4 (1331 nm), principles the same as or similar to principles described above can be applied to make and use optical multiplexers and that multiplex other sets of wavelengths such as other sets of wavelengths corresponding to channels for CWDM defined by the in ITU standard G.694.2, in other embodiments.

Although embodiments described above involve multiplexing four sets of wavelengths, principles the same as or similar to principles described above can be applied to make and use optical multiplexers that multiplex sets of wavelengths having suitable numbers of wavelengths more or less than four, such as eight, sixteen, etc., in other embodiments.

At least some of the various blocks, operations, and techniques described above are suitably implemented utilizing hardware circuitry, such as one or more of discrete components, an integrated circuit (IC), an application specific IC (ASIC), etc., or any combination thereof.

While the present invention has been described with reference to specific examples, which are intended to be illustrative only and not to be limiting of the invention, changes, additions and/or deletions may be made to the disclosed embodiments without departing from the scope of the invention.

What is claimed is:

1. An optical multiplexer, comprising:
a first Mach-Zehnder interferometer (MZI) configured to generate a first intermediate optical signal based on i) a first input optical signal at a first wavelength received at a first input of the first MZI, and ii) a second input optical signal at a second wavelength received at a second input of the first MZI;
a second MZI configured to generate a second intermediate optical signal based on i) a third input optical signal at a third wavelength received at a first input of the second MZI, and ii) a fourth input optical signal at a fourth wavelength received at a second input of the second MZI; and
a polarization combiner rotator (PCR) coupled to the first MZI and the second MZI, the PCR configured to generate an output optical signal based on i) the first intermediate optical signal received at a first input of the PCR, and ii) the second intermediate optical signal received at a second input of the PCR, the output optical signal including the first input optical signal, the second input optical signal, the third input optical signal, and the fourth input optical signal, the PCR comprising an adiabatic mode multiplexer configured to generate a third intermediate optical signal based on the first intermediate optical signal and the second intermediate optical signal, the adiabatic mode multiplexer including an adiabatic coupler having:
a first waveguide configured to receive the first optical signal, the first waveguide including a first tapered portion having a first wide end and a first narrow end, and
a second waveguide configured to receive the second intermediate optical signal, the adiabatic mode multiplexer configured to transfer the second intermediate optical signal to the first waveguide, the second waveguide including a second tapered portion proximate to the first tapered portion of the first waveguide, the second tapered portion having i) a second narrow end proximate to the first wide end of the first waveguide, and ii) a second wide end proximate to the first narrow end of the first waveguide.

2. The optical multiplexer of claim 1, wherein the PCR further comprises:
a polarization rotator configured to generate the output optical signal based on the third intermediate optical signal.

3. The optical multiplexer of claim 2, wherein the polarization rotator comprises a bi-level taper.

4. The optical multiplexer of claim 1, wherein:
a width of the first tapered portion changes non-linearly between the first wide end and the first narrow end; and
a width of the second tapered portion changes non-linearly between the second wide end and the second narrow end.

5. The optical multiplexer of claim 1, wherein the first MZI comprises:
a first optical coupler fabricated using silicon (Si);
a second optical coupler fabricated using Si;
a first arm to optically couple the first optical coupler to the second optical coupler, the second arm fabricated using silicon nitride (SiN) and having a first length; and
a second arm to optically couple the first optical coupler to the second optical coupler, the second arm fabricated using SiN and having a second length different than the first length.

6. An optical transmitter, comprising the optical multiplexer of claim 1, the optical transmitter further comprising:
a plurality of lasers;
a plurality of optical modulators coupled to the plurality of lasers;
a baseband processor configured to:
receive data that is to be transmitted, and
generate, based on the data that is to be transmitted, modulation signals for controlling the plurality of optical modulators; and
wherein i) the first input of the first MZI is coupled to a first optical modulator among the plurality of optical modulators, and ii) the second input of the first MZI is coupled to a second optical modulator among the plurality of optical modulators; and
wherein i) the first input of the second MZI is coupled to a third optical modulator among the plurality of optical modulators, and ii) the second input of the second MZI is coupled to a fourth optical modulator among the plurality of optical modulators.

7. The optical transmitter of claim 6, wherein the baseband processor comprises digital signal processing (DSP) circuitry configured to perform one or more of i) forward error correction (FEC) encoding, ii) signal pre-compensation, and iii) mapping data that is to be transmitted to transmission symbols.

8. The optical transmitter of claim 7, wherein the DSP circuitry is further configured to generate digital modulation signals based on the transmissions symbols.

9. The optical transmitter of claim 8, further comprising:
analog front end (AFE) circuitry that is configured to generate analog modulation signals based on the digital modulation signals; and
wherein the plurality of optical modulators are configured to use the analog modulation signals to modulate respective light output by the plurality of lasers.

* * * * *